United States Patent [19]

Fasano

[11] Patent Number: 4,573,100

[45] Date of Patent: Feb. 25, 1986

[54] TELEPHONE TWO ELEMENT GAS TUBE PROTECTOR MODULE

[75] Inventor: Michael Fasano, Syosset, N.Y.

[73] Assignee: Porta Systems Corp., Syosset, N.Y.

[21] Appl. No.: 607,653

[22] Filed: May 7, 1984

[51] Int. Cl.[4] .......... H02H 9/06

[52] U.S. Cl. .......... 361/119; 361/124; 337/32; 337/34

[58] Field of Search .......... 361/119, 124, 118, 111, 361/117, 120, 428, 426; 337/28, 29, 32, 33, 34; 339/111, 99 R, 198 R, 198 G, 198 GA, 198 P; 179/91 R, 98, 99

[56] References Cited

U.S. PATENT DOCUMENTS 4,159,500 6/1979 Baumbach et al. .......... 361/119

4,327,393 4/1982 Hines et al. .......... 361/119

*Primary Examiner*—Patrick R. Salce

*Attorney, Agent, or Firm*—Charles E. Temko

[57] ABSTRACT

An improved telephone protector module for individual subscriber circuits of generally planar configuration, and having heat-sensitive means employing a solder pellet which, upon melting, flows through capillary action to effect a shorting to ground. Secondary air gap means is provided by spacing a pair of conductive parts using a thin insulative wafer having openings therein forming an interruption in the insulation.

4 Claims, 16 Drawing Figures

TELEPHONE TWO ELEMENT GAS TUBE PROTECTOR MODULE

BACKGROUND OF THE INVENTION

This invention relates generally to the field of telephony, and more particularly to an improved telephone protector module of specialized type suitable for use in areas other than the usual frame mounted connector block. In such locations, there is need of a module of flattened configuration, of an order of one-quarter inch thickness or less. Such requirement eliminates the possibility of using conventional cylindrically shaped heat coils as well as conventional secondary air gap means usually required in a gas tube type protector. Typical areas of installation are network interface devices at the subscriber location which are located in a wall mounted assembly, and the like.

In the manufacture of a protective module of the type described, it is desirable to incorporate state-of-the-art technology for maximum efficiency. The use of conductor gas tubes and secondary air gap means which become operative upon gas tube failure is particularly important.

SUMMARY OF THE INVENTION

Briefly stated, the invention contemplates the provision of an improved protector module of the class described in which the housing thereof is of planar configuration in the order of 0.25 inches in thickness. The housing contains a pair of two element gas tubes arranged in side-by-side relation. At one end of each gas tube is a normal circuit conductor and a ground conductor which are separated by a foraminous insulative strip only three mils in thickness and formed as a laminate with a base of polyamide material, each side surface of which is laminated to a layer of fluorocarbon resin. One of a plurality of openings in the insulative strip froms a secondary air gap means. Another pair of through openings are aligned with corresponding openings in the conductor and ground strips, and permit the engagement of one end of the gas tube in conductive relation with the conductive strip whereby it is conducted through the casing of the gas tube and then to a ground conductor. Other aligned through openings in the conductor and ground contacts accommodate the opposite end pin of the gas tubes such that contact is not made with the grounding strip. This pin is surrounded by a hollow cylindrical solder pellet. Upon the occurrence of an excess voltage surge, the gas tube becomes conductive to ground. In the event of gas tube failure, the secondary air gap means becomes operative. Upon the occurrence of a sustained excess current surge, the gas tube becomes heated and provides its own permanent short to ground. Should the gas tube become inoperative, the continued flow of current through the gas tube heats the same sufficient to melt the solder pellet which then flows through capillary action through the opening in the insulative strip and ground contact to establish a short between the conductor contact and the ground contact.

BRIEF DESCRIPTION OF THE DRAWINGS

In the drawings, to which reference will be made in the specification, similar reference characters have been employed to designate corresponding parts throughout the several views.

DETAILED DESCRIPTION OF THE DISCLOSED EMBODIMENT

Figure 5:
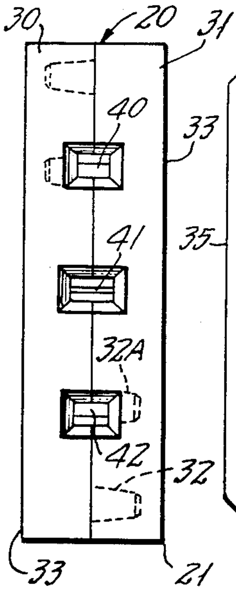
FIG. 5 is an end elevational view thereof.
Figure 1:
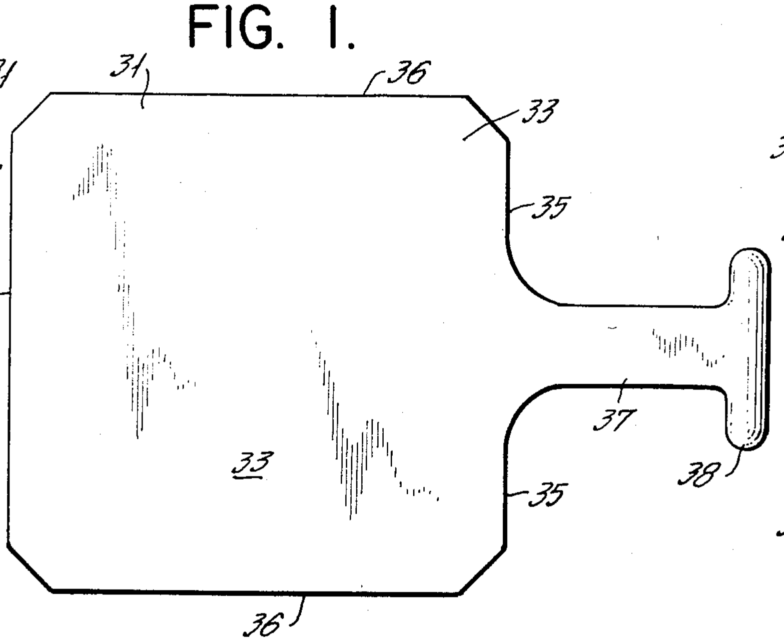
FIG. 1 is a side elevational view of an embodiment of the invention.
Figure 7:
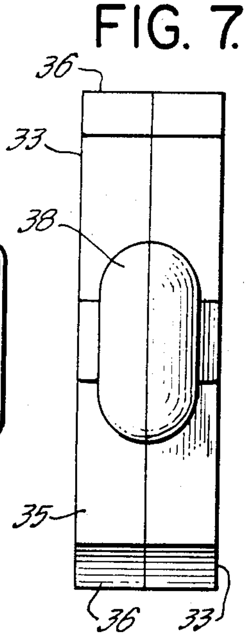
FIG. 7 is an end elevational view, as seen from the right-hand portion of FIG. 4.
Figure 2:
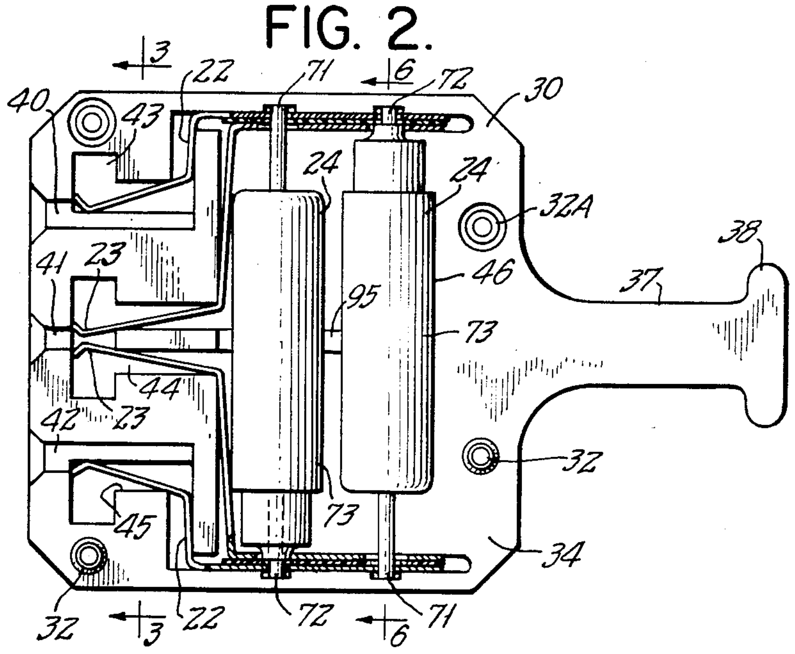
FIG. 2 is a side elevational view of one of a pair of symmetrical housing members comprising a synthetic resinous housing element.
Figure 3:
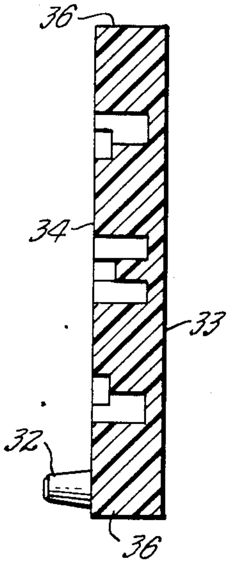
FIG. 3 is a transverse sectional view thereof as seen from the plane 3—3 in FIG. 2.

In accordance with the invention, the device, generally indicated by reference character 20 comprises broadly: a housing element 21, a plurality of conductor or line contacts 22, a plurality of ground contacts 23, a pair of gas tube elements 24, a plurality of insulative members 25, and a plurality of solder pellets 26.

The housing element 21 is preferably formed as a pair of housing members 30 and 31, fabricated from synthetic resinous materials using known injection molding techniques. Each member 30–31 is of generally rectangular configuration, the member 30 including a plurality of projecting pins 32 which engage corresponding recesses 32A in the member 31 wherein they may be heat sealed in engagement. Each member is bounded by an outer surface 33, an inner surface 34, end surfaces 35 and side surfaces 36. An integral handle 37 includes an enlarged tip 38 to facilitate installation or removal of the device.

Figure 6:
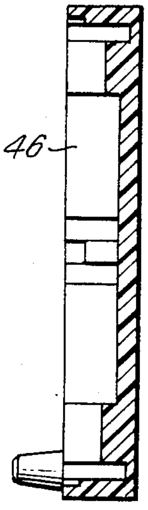
FIG. 6 is a transverse sectional view as seen from the plan 6—6 in FIG. 2.
Figure 4:
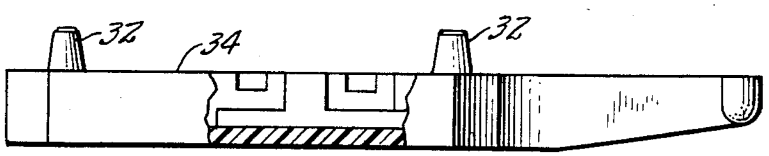
FIG. 4 is a side elevational view thereof, partly in section.
Figure 12:
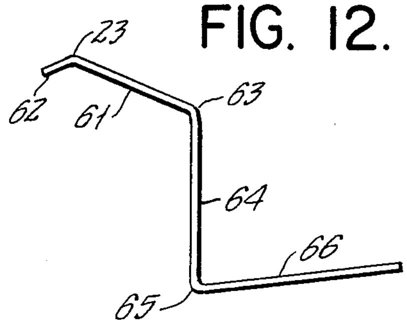
FIG. 12 is a top plan view of a ground contact.
Figure 11:
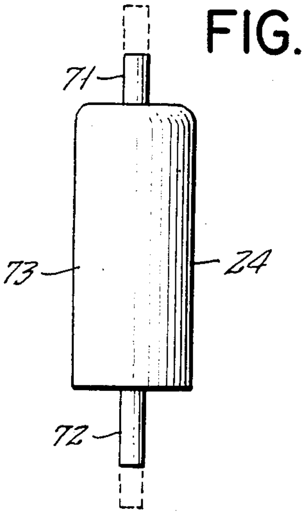
FIG. 11 is a side elevational view of a gas tube element.
Figure 13:
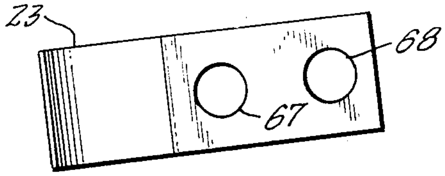
FIG. 13 is a side elevational view thereof as seen from the lower portion of FIG. 12.

Extending inwardly from each inner surface 34 are first, second and third entrance channels 40, 41 and 42, respectively. Contact retaining channels 43, 44 and 45 communicate with the channels 40–42, as does a gas tube recess 46 of generally rectangular configuration (see FIG. 6).

The line contacts 22 are most suitably beryllium copper stampings, preferably tin-plated for improved conductivity. Each includes a flexible pin contact portion 51 having a bent tip 52. A bent portion 53 communicates with an offset portion 54 to a second bent portion 55 and an elongated planar portion 56 having first and second through openings 57 and 58.

The ground contacts 23 are generally similar, each including a flexible pin contact portion 61 having a bent tip 62, a bent portion 63, an offset portion 64, a second bent portion 65 and an elongated planar portion 66 having somewhat larger first and second openings 67 and 68.

The gas tube elements 2 are known in the art as a two element type having first and second oppositely directed contact pins 71 and 72 which are axially aligned. The pin 71 communicates with a conductive outer casing 73, while the pin 72 does not.

Figure 10:
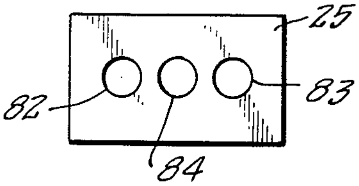
FIG. 10 is a side elevational view of an insulative air gap forming member.
Figure 8:
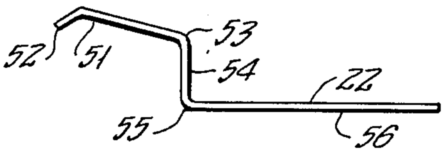
FIG. 8 is a top plan view of a line contact element.
Figure 9:
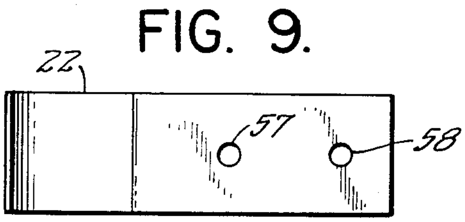
FIG. 9 is a side elevational view thereof as seen from the lower portion of FIG. 8.
Figure 15:
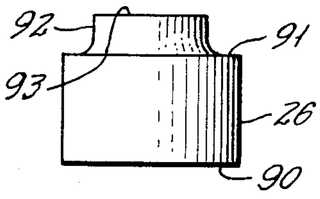
FIG. 15 is a side elevational view of a solder pellet.
Figure 16:
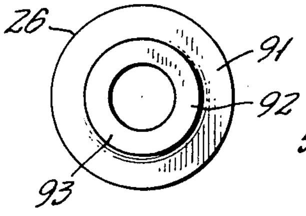
FIG. 16 is an end elevational view thereof.

The insulative members 25 (FIG. 10) consists of a rectangular strip of polymide material approximately two mils thick, each side of which may be coated with a one-half mil lamina of fluorocarbon resin. It is positioned between the elongated portions 56 and 66 to electrically separate them. The strip 80 includes first and second openings 82 and 82 alignable with the openings 57-58 and 67-68, and a third opening 84 which forms a secondary air gap which becomes operative upon the occurrence of gas tube misfunction.

Figure 14:
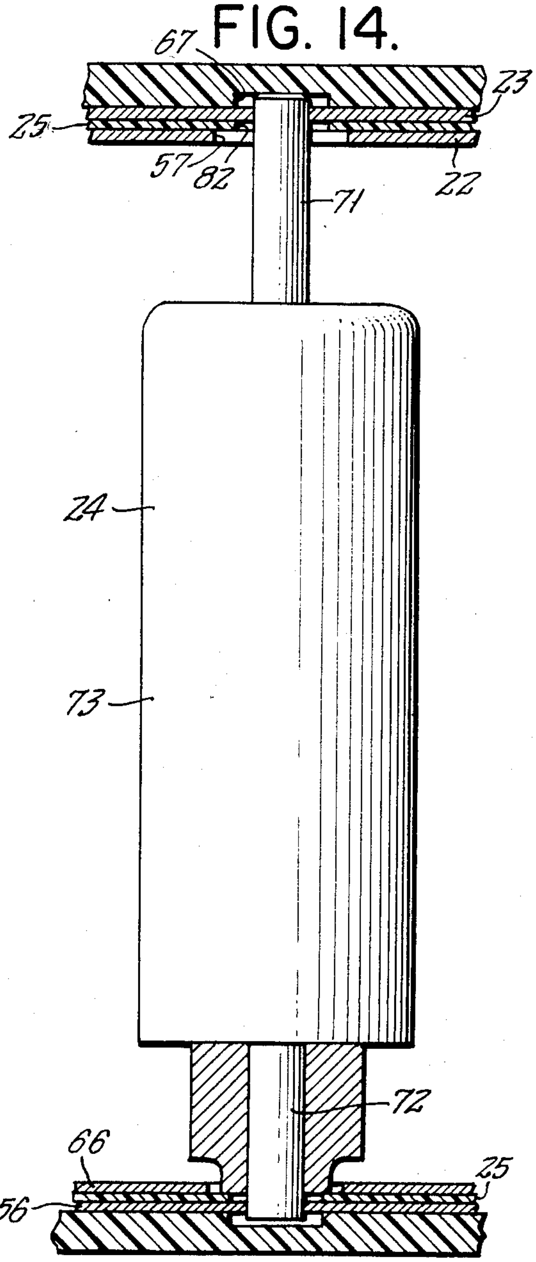
FIG. 14 is an enlarged plan view corresponding to that seen in FIG. 2, showing the interconnection of gas tube elements with corresponding line and ground contacts.

The solder pellets 26 are preferably of eutectic material, composed of approximately 50% bismuth, 27% lead, 13% tin, and 10% cadmium to have a melting temperature ranging from 155 to 161 degrees F. For hardness, they are preferably heat-treated in a sodium hydroxide solution. Each washer is bounded by an inner end surface 90, and an outer end surface 91 from which an axially oriented hub 92 projects. The outer surface 93 of the hub clears the corresponding opening in the ground contact, and rests upon a surface of the strip 80 (See FIG. 14).

During assembly, the gas tube elements 24 are positioned in oppositely facing directions, so that a pin which communicates with the gas tube housing communicates with each of the line contacts 22.

OPERATION

During operation, the device 20 engages a pair of line conductive contacts, such as wire wrap pins (not shown) representing a subscriber pair, and a third pin (not shown) connected to a source of ground potential. During normal operation, tip and ring current flows from one line contact to the other bypassing the device.

Upon the occurrence of an excess voltage surge, one or both of the gas tubes will become conductive, and the surge will be shorted to ground. Upon the occurrence of an excess current surge, as long as the current is within the capability of the gas tube, the identical action will happen. With current in excess of the gas tube capability, the identical action will happen. Current in excess of that which can be accommodated by the gas tube will cause a permanent mechanical shorting within the tube which is irreversible in nature.

Should the gas tubes misfunction, the secondary air gap formed by the third opening in the strip 25 will become operative, and arcing will occur between the line contact 22 and ground contact 23. With the gas tubes not functioning, excess current will cause a heating of the gas tubes to the melting temperature of the solder pellets. On such occurrence, solder flows under capillary action along the pin 72 which it surrounds to reach the corresponding ground contact 23 and thus effect a short circuit to ground.

I wish it to be understood that I do not consider the invention limited to the precise details of structure shown and set forth in this specification, for obvious modifications will occur to those skilled in the art to which the invention pertains.

I claim:

1. A telephone protector module for use in protecting an individual subscribed pair comprising: a housing element including first and second generally planar mating members defining plural cavities therebetween; a pair of two element gas tubes disposed in mutually parallel relation within one of said cavities, first and second conductor contacts each having first terminals positioned in another of said cavities, and having a first end thereof extending to an opening in said casing element to selectively engage a pin contact communicating with one of said subscriber pair, and a second end of generally planar configuration and having a pair of openings extending through the plane thereof; at least one ground contact having a first terminal positioned in another of said cavities, and having a first end extending to an opening in said casing element to selectively engage a ground pin contact projectible into said housing element; said ground contact having a second end of generally planar configuration, said end having a pair of openings extending through the plane thereof; said second end of at least one conductor contact and said ground contact being disposed in congruent spaced relation; a thin insulative strip positioned between said last mentioned second ends and having openings therein aligned with the aligned openings in said second ends; said first and second gas tube elements being positioned between said second ends of each of said first and second conductor contacts and said at least one ground contact; each of said gas tube elements having oppositely directed pin contacts, engaging the openings in said conductor contacts, and passing through the opening in said at least one ground contact and said insulative strip; said outer housings of said gas tubes communicating with only one of said oppositely disposed pins; whereby current, under abnormal operating conditions may flow through one of said conductor contacts, and through the housing of a said gas tube to said at least one ground contact.

2. A telephone protector module for use in protecting an individual subscriber pair comprising: a housing element including first and second generally planar mating members defining plural cavities therebetween; a pair of two element gas tubes disposed in mutually parallel relation within one of said cavities; first and second conductor contacts each having a first terminal disposed in another of said cavities and having a first end extending to an opening in said casing element to selectively engage a pin contact communicating with one of said subscriber pair, and a second end of generally planar configuration and having a pair of openings extending through the plane thereof; first and second ground contacts each having a first terminal positioned in another of said cavities and having a first end extending to a common opening in said casing element to selectively engage a ground pin contact projectible into said housing element; said ground contacts each having a second end of generally planar configuration and having a pair of openings extending through the plane thereof; said second ends of said conductor contacts and said ground contacts being disposed in spaced congruent relation; a thin insulative strip positioned between said last-mentioned second ends and having openings therein aligned with the aligned openings in said second ends; each of said gas tubes having oppositely disposed pin contacts engaging the openings in said line contacts and passing through the openings in said insulating strip; said gas tubes having an outer conductive housing communicating with only one of said oppositely directed pins, to communicate with a ground contact; whereby current under abnormal operating conditions may flow through one of said conductor contacts, and though the housing of a gas tube, to a ground contact.

3. A protector module in accordance with claim 2, said insulative strip having an additional through opening therein to serve as a secondary air gap means in the event of gas tube malfunction.

4. A protector module in accordance with claim 2, the other of said oppositely disposed pins on each of said gas tube elements engaging openings in said second ends of said line contacts and passing through said aligned openings in said insulative strip and ground contacts, and a hollow cylindrical solder pellet surrounding each of said last-mentioned pins; whereby upon the occurrence of an excess current surge sufficient to cause at least one of said gas tubes to overheat, said solder pellet may melt to flow under capillary action to establish communication between said conductor and ground contacts on at least one side of said gas tube elements.

* * * * *